(12) United States Patent
Ogrinc et al.

(10) Patent No.: US 6,692,668 B2
(45) Date of Patent: Feb. 17, 2004

(54) METHOD FOR MANUFACTURING PELLETS OF HOT-MELT INK

(75) Inventors: Hendrik Jozef Antonius Ogrinc, JK Velden (NL); Wilhelmus Antonius Maria Schreurs, BA Tegelen (NL)

(73) Assignee: Oce-Technologies B.V., Ma Venlo (NL)

( * ) Notice: Subject to any disclaimer, the term of this patent is extended or adjusted under 35 U.S.C. 154(b) by 38 days.

(21) Appl. No.: 10/133,736

(22) Filed: Apr. 29, 2002

(65) Prior Publication Data

US 2002/0171160 A1 Nov. 21, 2002

(30) Foreign Application Priority Data

May 21, 2001 (EP) .............................. 01201893

(51) Int. Cl.[7] .......................... B29C 35/16; B29C 45/72
(52) U.S. Cl. ................... 264/28; 264/234; 264/327; 264/328.14; 264/334; 264/342
(58) Field of Search ............... 264/328.14, 328.18, 264/334, 304, 299, 342, 234, 327, 28

(56) References Cited

U.S. PATENT DOCUMENTS

| 4,684,956 A | 8/1987 | Ball |
| 4,723,135 A | 2/1988 | Yano et al. |
| 4,857,401 A * | 8/1989 | Sieverding .................. 428/336 |
| 5,278,106 A * | 1/1994 | Nakashima et al. .......... 501/12 |
| 6,143,402 A * | 11/2000 | Reisacher ................... 428/323 |

FOREIGN PATENT DOCUMENTS

| EP | 62-256879 | | 9/1987 | | |
| EP | 0 856 565 A1 | | 5/1998 | | |
| EP | 0 978 548 A1 | | 9/2000 | | |
| EP | 1 067 157 A1 | | 1/2001 | | |
| EP | 1 067 157 A1 | | 10/2001 | | |
| EP | 1260562 A1 | * | 11/2002 | ........... | C09D/11/00 |

* cited by examiner

Primary Examiner—Michael Colaianni
Assistant Examiner—Monica A Fontaine
(74) Attorney, Agent, or Firm—Birch, Stewart, Kolasch & Birch, LLP

(57) ABSTRACT

A method for manufacturing pellets of hot-melt ink which solidifies with a cooling rate-dependent shrinkage, comprising the steps of filling molten ink into a mold formed by two mold dies, allowing the ink to cool down and to solidify in the mold, and opening the mold and removing the ink pellet therefrom, wherein in the cooling step, the ink is shock-cooled with a cooling rate that results in a shrinkage sufficient to cause the solidifying ink to separate from at least one of the mold dies.

12 Claims, 1 Drawing Sheet

METHOD FOR MANUFACTURING PELLETS OF HOT-MELT INK

BACKGROUND OF THE INVENTION

Field of the Invention

The present invention relates to a method of manufacturing pellets of hot-melt ink.

Certain types of inkjet printers employ a so-called hot-melt ink i.e. a wax-like ink material that is solid at room temperature and has a melting point, for example, in the order of 100 or 120° C. In the printhead of the printer, the ink is heated above it's melting point, so that droplets of liquid ink can be expelled through the nozzles of the printhead. In order to obtain a high quality of the printed image, the viscosity and hence the temperature of the molten ink in the printhead should be maintained essentially constant. However, since the ink is consumed in the course of the printing process, and the ink reservoir accommodating the liquid ink within the printhead is only of a limited size, it is necessary to supply and melt solid ink while the printer is operating, and the latent heat required for melting the ink tends to decrease the temperature in the ink reservoir. For this reason, it is desirable that the amount of solid ink supplied to the ink reservoir can precisely be controlled and metered, and, to this end, it is advantageous that the ink is supplied in the form of pellets having a predetermined size and shape, e.g. in the form of small spherical pills.

Since the hot-melt ink is a thermoplastic material, the pellets having the desired shape and size can be manufactured by means of a molding process similar to injection molding processes known for manufacturing articles from thermoplastic resins. The molding process should however be adapted to the specific properties of hot melt ink which are in certain respects different from those of thermoplastic synthetic resins. Since the amount of shrinkage, which the hot-melt ink experiences when it is solidified, is comparatively low, and since a certain shrinkage can be tolerated because the final appearance of molded ink pellets is not critical, it is not necessary to apply high locking forces for keeping the mold closed during the molding process. On the other hand, since the hot-melt ink has a relatively low melting point, it tends to solidify immediately when it comes into contact with the walls of the mold cavity. This effect and the fact that the surface of the ink pellet is somewhat tacky, even when the temperature has dropped below the melting point, increases the tendency of the pellet to adhere to the walls of the mold cavity. This makes it more difficult to reliably and reproducingly remove the molded pellet from the molding die.

It is well-known that the removal of a molded product from a die can be facilitated by employing a separating agent which reduces the adherence between the molded product and the walls of the mold cavity. However, a portion of the separating agent inevitably is dispersed or diluted in the molten material, and this is not acceptable in the case of hot-melt ink, because it would cause a deterioration in the quality of the ink. For example, even minute particles of the separating agent, when dispersed in the ink, tends to clog the extremely fine nozzles of the printhead.

It might be considered to use a mold made of a material such as silicon rubber, to which the molten ink does not tend to adhere. However, such materials also become diluted in the molten ink to some extent and therefore the problem of ink contamination is not resolved.

SUMMARY OF THE INVENTION

It is an object of the present invention to provide a method for manufacturing pellets of hot-melt ink, in which even when the ink material tends to adhere to the walls of the mold cavity, the pellets can reliably and reproducibly be separated from the mold.

According to the present invention, the ink is shock-cooled with a cooling rate that results in a shrinkage sufficient to cause the solidifying ink to separate from at least one of the mold dies.

Although, as has been stated above, the amount of shrinkage of the hot-melt inks is comparatively low, such inks show a certain shrinkage effect when they are solidified. It has been found that, for the commonly used hot-melt ink compositions, the amount of shrinkage depends on the cooling rate with which the ink is solidified. When cooled more rapidly, the solidifying ink tends to form fewer but larger crystal grains, and this results in a crystal structure in which the solidified ink has a higher density and, hence, experiences a larger shrinkage. It has been found that this shrinkage effect can be utilized for facilitating the removal of the ink pellets from the mold. When the molten ink is poured into the mold cavity, the heat of the ink is dissipated through the walls of the mold, and the solidification process starts at the internal walls of the mold cavity and then proceeds towards the interior of the pellet. Thus, one might expect that the ink would tend to adhere more firmly the walls of the mold cavity when the temperature of the mold is significantly lower than that of the ink. It has been found however that the shrinkage effect mentioned above leads to a relatively uniform contraction of the pellet as a whole rather than to the formation of voids in the interior of the pellet. Thus, the contraction of the pellet solidifying in the mold cavity forces the outer layer of the ink material to withdraw and separate from the wall surface of the mold. As a result, the removal of the pellet from the mold can be facilitated by appropriately controlling the amount of shrinkage, i.e. by appropriately adjusting the cooling rate at which the solidification process takes place. This implies a relatively fast cooling process which is defined as "shock-cooling" in the present invention.

In general, increasing the cooling rate will have the effect that the pellets are more readily and more reliably removed from the mold. It should be avoided however to use extremely high cooling rates which would lead to an amorphous solidification of the ink. For certain compositions of hot-melt ink, a too high cooling rate may also lead to high thermal stresses in the ink material, so that the risk of damage to the ink pellets is increased. In addition, a high cooling rate will normally require more powerful cooling equipment and lead to an increased in power consumption. The cooling rate that is optimal in view of these considerations depends on the specific composition of the hot-melt ink and may be determined by experiment. Typical hot melt inks are known inter alia from European patent applications EP 0 856 565, EP 0 978 548, EP 1 067 157 and from unpublished Dutch patent application 1017049.

Shock-cooling in the meaning of the present invention can conveniently be achieved by placing the molds filled with the molten ink in a cooling environment, e.g. a cooling chamber, which is maintained at a suitably low temperature. The temperature in this chamber, which may, for example, be in the range of from +30° C. to −30° C., for example about −10° C., depends on the type of ink, which, in turn, determine the cooling rate.

More preferably, the mold is placed in the cooling chamber before the molten ink is added thereto. Thus, the walls of the mold will already be cool down to approximately the temperature of the cooling chamber before the molten ink is added, and the heat of the molten ink will then be rapidly absorbed by the walls of the mold. In this context, it is also preferable if the mold if made of a material, e.g. a metal, which has a high heat conductivity and a high heat capacity. In order to increase the heat capacity of the mold and hence the cooling rate, a mold having relatively thick walls may be advantageous.

As is generally known in the art, the mold may consist of a lower die and an upper die, with a runner hole being formed in the upper die. In order to remove the pellet from the mold, the mold dies are separated from one another in a vertical direction. If the mold cavity is spherical, for example, it is frequently observed that the pellet tends to stick to the upper die after the mold has been opened. The reason is that a small amount of ink remaining in the runner hole experiences only a small shrinkage effect and therefore adheres to the upper die, so that whole pellet is attached to the upper die. This effect may be eliminated by carefully controlling the amount of ink poured into the mold cavity. On the other hand, this effect may also be used for positively assuring that the pellets stick to the upper die. Then, the pellets may be separated from the upper die by vibrating the die or by injecting it with compressed air or by inserting an ejector pin through the runner hole. The pellets will simply drop out of the upper die and can easily be collected and discharged through a chute or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
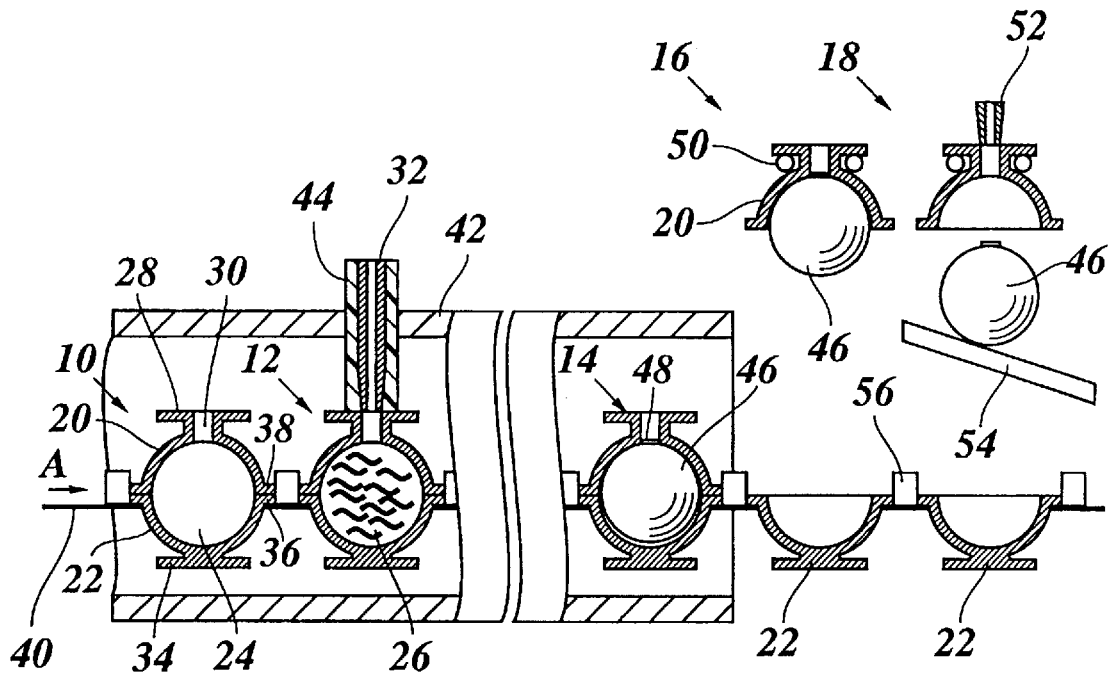
FIG. 1 illustrates a continuous process for molding hot-melt ink pellets and removing them from a mold cavity.

FIG. 1 shows a number molds 10, 12, 14, 16, and 18, each of which comprises an upper die 20 and a lower die 22, each having a semi-spherical cup shape which, when combined together define a mold cavity 24 which is filled with molten hot-melt ink 26. The upper die 20 is integrally formed with a top flange 28 and has a runner hole 30 formed in the center of the flange 28, so that molten ink can be poured into the mold cavity 26 through the nozzle 32.

The lower die 22 is essentially a mirror image, relative to the upper die 20 and has a bottom 34 formed integrally therewith. The lower edge of the upper die 20 and the upper edge of the lower die 22 are surrounded by circumferential flanges 36, 38 which are held in firm engagement with one another in order to sealingly close the mold cavity 24.

The lower dies 22 of the molds are inserted into receiving openings of a belt-type conveyer 40 which supports the flanges 36 of the lower dies 22. The conveyer 40 feeds the molds 10–14 intermittently in the direction of the arrow A through an elongated, tunnel-like cooling chamber 42 only parts of which are shown in FIG. 1. The cooling chamber 42 has thermally insulating walls, and the interior of this cooling chamber is kept at a constant temperature of e.g. −10° C. by any suitable type of cooling means which are well known in the art and not described here.

The molds 10–18 are made of metal, e.g. aluminum or any other material having a high heat conductivity and have relatively thin walls. Thus, while the mold 10 is conveyed through the cooling chamber 42 towards the position of the nozzle 32, it will already be cooled down to the temperature of the cooling chamber. When the mold stops at the position of the nozzle 32, as in the case of the mold 12 in FIG. 1, the nozzle 32 is connected to the runner hole 30, and the molten ink 26 is introduced into the mold cavity. The nozzle 32 is surrounded by a thermally insulated sheath 44 in order to prevent the molten ink from solidifying prematurely in the nozzle 32.

When the mold cavity 24 has been filled completely, the nozzle 32 is slightly lifted off from the top flange 28 of the mold, and the conveyer 40 moves one step further to bring the next mold 10 into the position of the nozzle 32, whereupon the filling process is repeated.

While the molds filled with molten ink are intermittently conveyed through the part of the cooling chamber 42 downstream of the nozzle 32, as in the case of mold 14 in FIG. 1, the heat of the ink is rapidly dissipated through the thin walls of the mold, so that the ink is shock-cooled and solidifies in the mold cavity so as to form a spherical ink pellet 46. The cooling rate at which the ink solidifies is sufficiently high to cause a significant shrinkage of the ink material. Due to this shrinkage, the outer circumferential surface of the ink pellet 46 is separated from the internal walls of the mold cavity.

As has been shown for the mold 14 in FIG. 1, the mold cavity is filled to such an extent that a small plug 48 of ink is formed in the runner hole 30 of the mold. Since this plug 48 undergoes only little shrinkage, it adheres to the walls of the runner hole, so that the ink pellet 46 remains slightly attached to the top portion of the upper die 20.

When the ink pellet 46 has completely solidified, the mold leaves the cooling chamber 42. Then, as has been shown for the molds 16 and 18, the upper die 20 is grasped by a lifting conveyer 50 and is lifted away from the lower die 22 together with the ink pellet 46. In order to fully remove the ink pellet from mold 18, a nozzle 52 is placed onto the runner hole 30, and the ink pellet 46 is ejected with compressed air. The ink pellet dropping out of the upper die 20 is then collected and discharged through a chute 54.

Instead of blowing compressed air through the runner hole of the upper die 20, it would also be possible to slightly vibrate the upper die in order to remove the ink pellet 46 therefrom.

The lower dies 22 and the upper dies 20 are then returned to the upstream side of the cooling chamber 42, and the molds are closed again before they again enter into the cooling chamber 42.

In the example shown, the conveyer 40 has lugs 56 which help to hold the upper dies 20 in alignment with the lower dies 24. If the conveyer 40 is an endless belt and is conveyed over guide rollers (not shown) which support only the lateral side portions of the belt, the lower dies 22 may be fixed to the belt. In this case, the lower dies 24 will be reversed when they are returned to the upstream side of the cooling chamber 42, and in the case that an ink pellet should have remained in the lower die 24, it would simply drop out and could also be collected. In case that an ink pellet should slightly stick to the lower die 22, vibrating means or similar mechanical means may be provided for removing the pellet from the lower die.

It should be observed that the size of the plug 48 has been exaggerated in FIG. 1 for illustration purposes. Likewise, the amount of shrinkage of the ink pellet 46 relative to the mold cavity 26 has been exaggerated. In practice, the shrinkage may amount to approximately 1–3% in volume.

It will be understood that the method described above is only one example for illustrating the principles of the present invention and may be modified in various ways. For example, instead of passing the molds 10–18 through a cooling chamber 42, it would also be possible to blow cold air against the molds or to immerse them into a cooling liquid in order to achieve a sufficient cooling rate.

Figure 2:
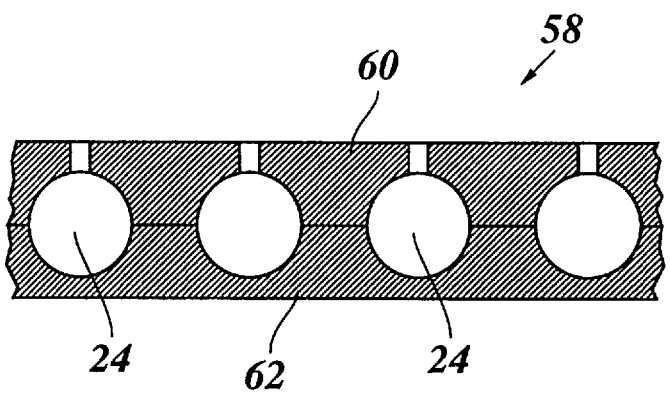
FIG. 2 is a sectional view of a multiple mold which is useable for the molding process according to a modified embodiment of the present invention.

Instead of a continuous manufacturing process, it is also possible to employ a batch process. In this case, it is preferable to use a multiple mold 58 an example of which has been shown in FIG. 2. The mold 58 has block-like upper and lower dies 60, 62 which, together, define a plurality of mold cavities 24. Since the metal blocks forming the upper and lower dies 60, 62 have a large heat capacity, the shock-cooling effect can be achieved simply be pre-cooling the mold 58 to a suitable temperature before the molten ink is filled into the mold cavities.

Instead of a metal mold, it is also possible to use a mold made of a synthetic resin, especially in case of a thin-walled mold as shown in FIG. 1.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing pellets of hot-melt ink which solidifies with a cooling rate-dependent shrinkage, comprising the steps of:

filling molten ink into a mold containing two mold dies, allowing the ink to cool down and to solidify in the mold, and opening the mold and removing the ink pellet therefrom, wherein in the cooling step the ink is shock-cooled with a cooling rate that results in a shrinkage sufficient to cause the solidifying ink to separate from at least one of the mold dies.

2. The method according to claim 1, wherein the cooling step is performed by placing the mold in an environment that is maintained at a predetermined temperature.

3. The method according to claim 2, wherein the mold is cooled to a predetermined temperature before the molten ink is introduced into the mold.

4. The method according to claim 2, wherein said predetermined temperature is less than room temperature.

5. The method according to claim 4, wherein said predetermined temperature is less than 10° C.

6. The method according to claim 4, wherein the predetermined temperature is less than 0° C.

7. The method according to claim 1, wherein the mold dies are made of metal.

8. The method according to claim 1, wherein the mold dies are massive blocks made of a material having a high heat conductivity and a high heat capacity.

9. The method according to claim 8, wherein the mold dies form a multiplicity of molds having a plurality of mold cavities.

10. The method according to claim 9, wherein the molds have an upper die and a lower die, a runner hole is formed in the upper die, and molten ink is filled into the mold through the runner hole to such a level that a plug of ink forms in the runner hole and attaches the ink pellet to the upper die.

11. The method according to claim 10, wherein the ink pellet is ejected from the upper die by means of an ejector nozzle or a pin acting upon the ink pellet through the runner hole.

12. The method according to claim 1, wherein the mold is cooled after the ink is introduced into the mold.

\* \* \* \* \*